US011495947B2

(12) United States Patent
Kidane et al.

(10) Patent No.: US 11,495,947 B2
(45) Date of Patent: Nov. 8, 2022

(54) CABLE RETAINER INSERT AND CONNECTOR FOR SHIELDING TRANSFER

(71) Applicant: TE Connectivity Germany GmbH, Bensheim (DE)

(72) Inventors: Abiel Kidane, Bensheim (DE); Andreas Herrmann, Bensheim (DE); Jens Koester, Bensheim (DE)

(73) Assignee: TE Connectivity Germany GmbH, Bensheim (DE)

( * ) Notice: Subject to any disclaimer, the term of this patent is extended or adjusted under 35 U.S.C. 154(b) by 0 days.

(21) Appl. No.: 17/104,180

(22) Filed: Nov. 25, 2020

(65) Prior Publication Data
US 2021/0159679 A1 May 27, 2021

(30) Foreign Application Priority Data
Nov. 26, 2019 (EP) ..................................... 19211606

(51) Int. Cl.
*H02G 3/04* (2006.01)
*H01R 13/6591* (2011.01)
*H01R 4/48* (2006.01)
*H01R 13/6592* (2011.01)

(52) U.S. Cl.
CPC ......... *H02G 3/0456* (2013.01); *H01R 4/4809* (2013.01); *H01R 13/6592* (2013.01); *H01R 13/65917* (2020.08); *H02G 3/0406* (2013.01)

(58) Field of Classification Search
CPC . H01R 2207/00; H01R 2201/26; H01R 24/86
See application file for complete search history.

(56) References Cited

U.S. PATENT DOCUMENTS

| 5,246,376 A | * | 9/1993 | Schuhl | H01R 9/0524 439/462 |
| 5,474,473 A | * | 12/1995 | Perretta | H01R 13/65912 439/607.5 |
| 6,227,881 B1 | * | 5/2001 | Tharp | H01R 13/65912 439/98 |
| 6,276,967 B1 | * | 8/2001 | Hall | H01R 13/6593 439/607.41 |
| 9,325,163 B2 | * | 4/2016 | Pelletier | H02G 15/04 |

FOREIGN PATENT DOCUMENTS

| DE | 102010051954 B3 | 2/2012 |
| EP | 2985840 A1 | 2/2016 |
| EP | 3101737 A1 | 12/2016 |
| JP | 2011249061 A | 12/2011 |

OTHER PUBLICATIONS

Extended European Search Report, European Application No. 19211606. 9-1201, European Filing Date, Apr. 29, 2020.

* cited by examiner

Primary Examiner — Jean F Duverne
(74) Attorney, Agent, or Firm — Barley Snyder

(57) ABSTRACT

A cable retainer insert for a multi-strand cable includes a cable contact portion and a plurality of cable receptacles in the cable contact portion circumferentially spaced from each other. Each of the cable receptacles receives a strand of the multi-strand cable. Each of the cable receptacles has a cable strand insertion opening at a radially outward end and a bottom at an opposite radially inward end. A circle inscribed in each of the cable receptacles and touching the bottom of the cable receptacle extends radially outward beyond the cable strand insertion opening.

19 Claims, 8 Drawing Sheets

CABLE RETAINER INSERT AND CONNECTOR FOR SHIELDING TRANSFER

CROSS-REFERENCE TO RELATED APPLICATION

This application claims the benefit of the filing date under 35 U.S.C. § 119(a)-(d) of European Patent Application No. 19211606.9, filed on Nov. 26, 2019.

FIELD OF THE INVENTION

The present invention relates to a cable retainer insert and, more particularly, to a cable retainer insert for a multi-strand cable.

BACKGROUND

Multi-strand cables combine shielded and unshielded strands in one cable. Such cables may be applied for power transmission combined with data transmission. In prior art solutions, the transmission of a shielding and the protective earth connection via a metal housing is cumbersome, such that connector backshells terminating a multi-strand cable are not versatile.

SUMMARY

A cable retainer insert for a multi-strand cable includes a cable contact portion and a plurality of cable receptacles in the cable contact portion circumferentially spaced from each other. Each of the cable receptacles receives a strand of the multi-strand cable. Each of the cable receptacles has a cable strand insertion opening at a radially outward end and a bottom at an opposite radially inward end. A circle inscribed in each of the cable receptacles and touching the bottom of the cable receptacle extends radially outward beyond the cable strand insertion opening.

BRIEF DESCRIPTION OF THE DRAWINGS

The invention will now be described by way of example with reference to the accompanying Figures, of which.

DETAILED DESCRIPTION OF THE EMBODIMENT(S)

Figure 1:
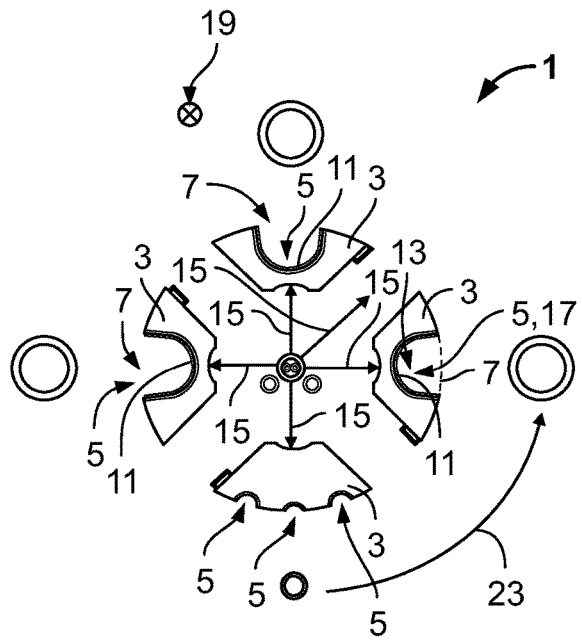
FIG. 1 is a front exploded view of a cable retainer insert according to an embodiment.

In the following, the present invention will be described with reference to the accompanying figures, which show exemplary embodiments. The present invention shall not be limited to the embodiments described below. In the following description of the figures, some technical features and technical features having the same technical effect are denoted using the same reference numeral. A repetitive description of technical features already introduced will be avoided, whereas differences will be explicitly given.

Figure 2:
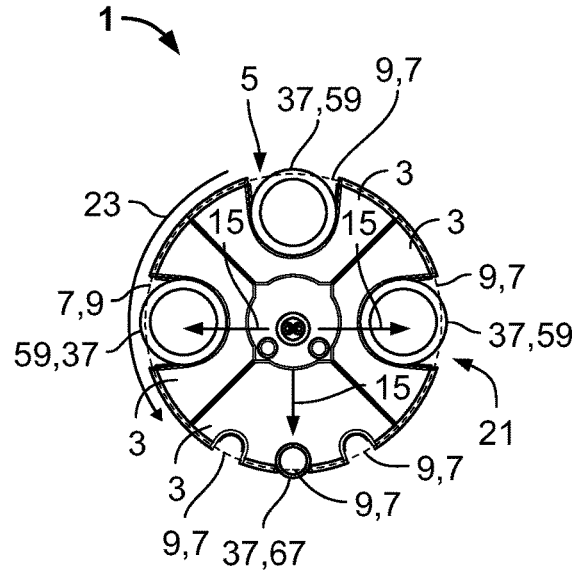
FIG. 2 is a front view of the cable retainer insert of FIG. 1.
Figure 3:
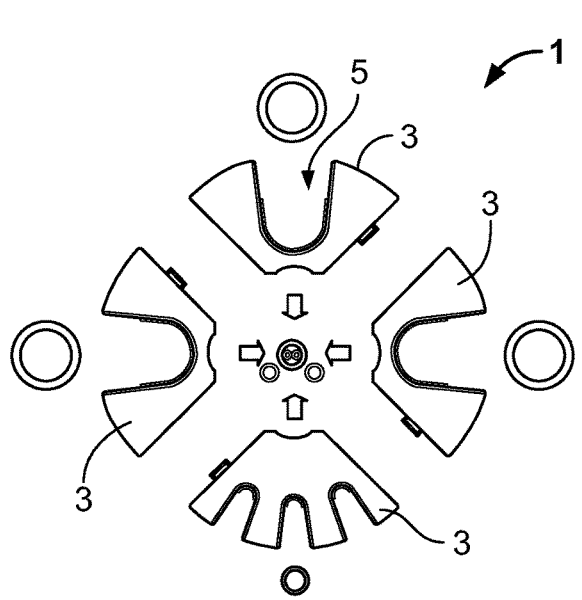
FIG. 3 is a front exploded view of a cable retainer insert according to another embodiment.

In FIGS. 1 to 8, different views of the inventive cable retainer insert 1 are shown. A first embodiment is shown in FIG. 1 and FIG. 2, a second embodiment in FIG. 3 to FIG. 7, and a third embodiment in FIG. 8.

All embodiments of the cable retainer insert 1 comprise four cable retainer insert modules 3. The embodiments shown are only exemplary embodiments, i.e. a different number of cable retainer insert modules 3 may be provided. In a further embodiment of the inventive cable retainer insert 1, the cable retainer insert 1 is one single piece, i.e. not modular. The cable retainer insert 1 may be flexible during assembly and that an almost arbitrary number of possible combinations of strands of different number and/or size may be reliably held and contacted by the cable retainer insert 1 comprising at least two cable retainer insert modules 3. If two cable retainer insert modules 3 are comprised they may have a form similar to a half circle. If three or more cable retainer insert modules 3 are provided, they may have a shape similar to a circular sector. Four cable retainer insert modules 3 are shaped similar to a circular sector with an angle of 90°. Any other number of cable retainer insert modules 3 may be applied.

In the embodiments shown in FIGS. 1-8, each of the cable retainer insert modules 3 has at least one cable receptacle 5, and one of the cable retainer insert modules 3 comprises three cable receptacles 5. For the sake of clarity, only in FIG. 1 are all cable receptacles 5 provided with a reference numeral. Each of the cable receptacles 5 has a cable strand insertion opening 7, which is, in a radial direction 15, located at an outward end 9. For clarification, in FIG. 1 the cable strand insertion opening 7 of the right cable retainer insert module 3 is indicated by a dashed line.

Opposite the outward end 9, each cable receptacle 5 has a bottom 11 at a radially inward end 13, as shown in FIGS. 1 and 2. The cable receptacles 5 therefore extend in the radial direction 15 and open out into the radial direction 15 and further correspond to a groove 17 in an axial direction 19, which is oriented into the drawing plane and which is open in and against the axial direction 19. The cable receptacles 5 are arranged in a circumferential direction 23, which is perpendicular to the radial direction 15.

The cable retainer insert 1 may comprise a plug end face, a cable end face both facing in the axial direction 19, as well as an outside contour which extends circumferentially between the two end faces. The end faces may be located parallel to each other displaced in the axial direction 19, wherein the cable receptacles 5 extend from the plug end face to the cable end face. The cable receptacles 5 may open out into the outside contour of the cable retainer insert 1. They may thus open out in a radial direction 15, which is oriented perpendicular to the axial direction 19.

The four cable retainer insert modules 3 of the first embodiment shown in FIGS. 1 and 2 constitute a cable contact portion 21 of the cable retainer insert 1. It is noted that the sense of rotation of the circumferential direction 23 is not important and only a question of definition. The cable contact portion 21 may have an outer contour in the shape of a circle, wherein said circle may be interrupted by the insertion openings 7 (at least one insertion opening) of the cable receptacles 5.

Figure 4:
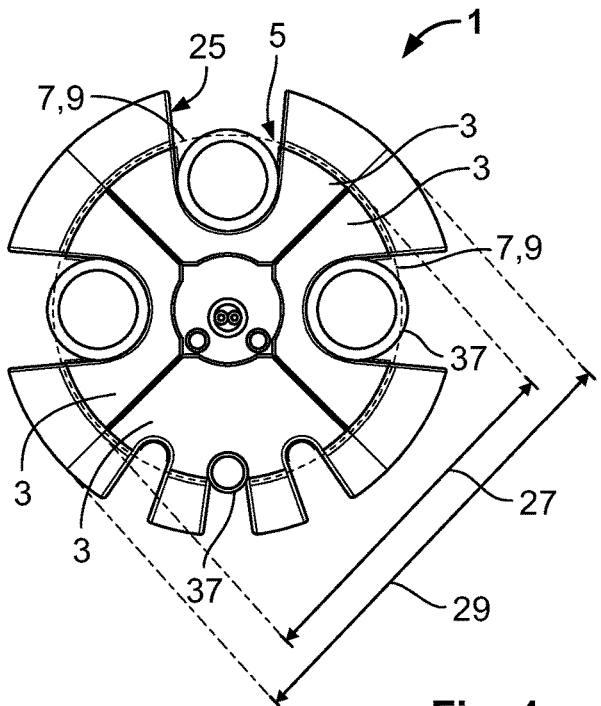
FIG. 4 is a front view of the cable retainer insert of FIG. 3.

In the case of the second and third embodiment of the inventive cable retainer insert 1, the cable contact portion 21 is best seen in FIG. 5 to FIG. 8. The second and third embodiment of the inventive cable retainer insert 1 further comprise a housing contact portion 25. This housing contact portion 25 is configured for electrically contacting a housing of a connector (see FIG. 13). A diameter 27 of the cable contact portion 21 is smaller than a diameter 29 of the housing contact portion 25; this is indicated in FIG. 4.

Figure 5:
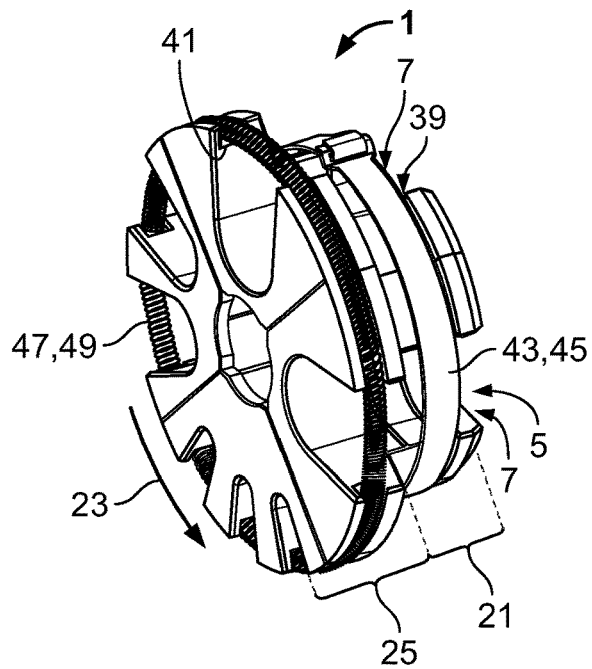
FIG. 5 is a front perspective view of the cable retainer insert of FIG. 3.
Figure 6:
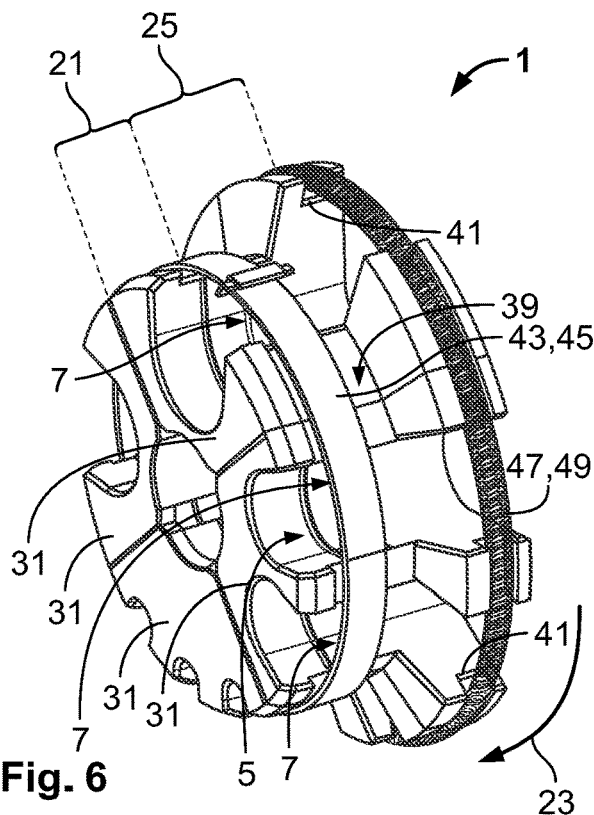
FIG. 6 is a rear perspective view of the cable retainer insert of FIG. 3.

As shown in FIG. 5 and FIG. 6, the cable contact portion 21 and the housing contact portion 25 are both cylindrical, wherein the cable retainer insert modules 3 of all embodiments shown are cylindrical sections 31 (the cylindrical sections 31 are only indicated by reference numerals in FIG. 6). The at least one cable receptacle 5 may extend through both the cable contact portion 21 and the housing contact portion 25.

In an assembled state, the cable contact portion 21 and/or the housing contact portion 25 may correspond to a cylindrical shape, wherein a height of said cylinders may be defined along the axial direction 19, which is oriented perpendicular to the radial direction 15. The height of the cylinder describing the cable contact portion 21 may be larger than the height of the cylinder describing the housing contact portion 25.

Figure 7:
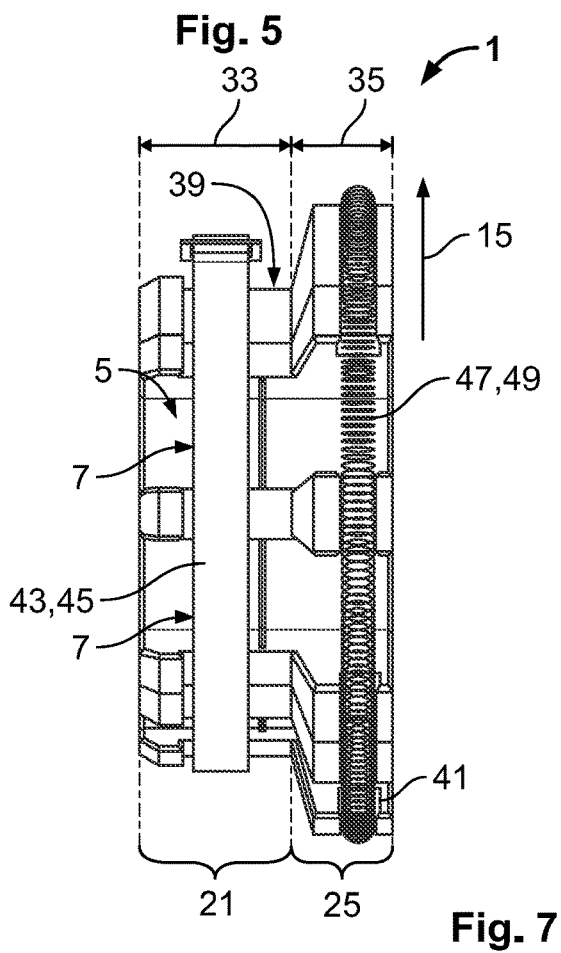
FIG. 7 is a side view of the cable retainer insert of FIG. 3.
Figure 8:
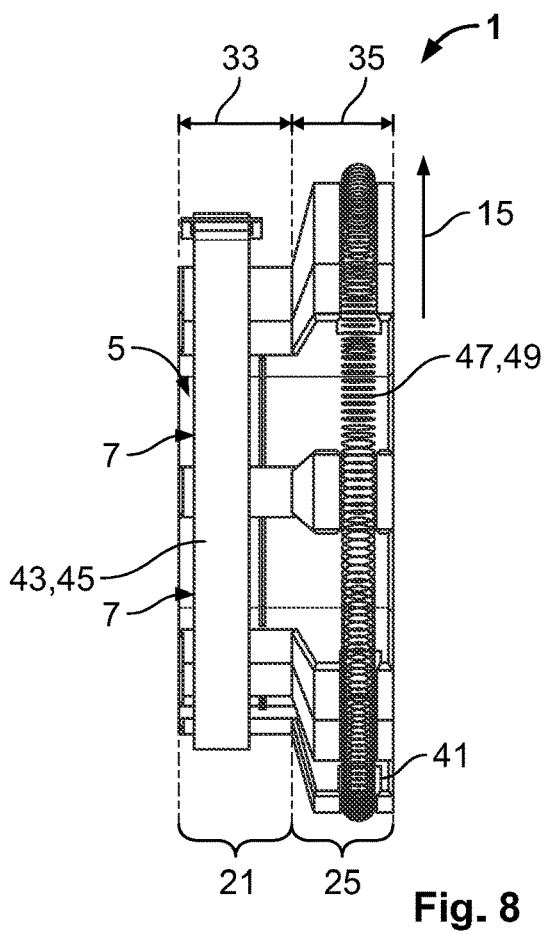
FIG. 8 is a side view of the cable retainer insert of FIG. 1.

As can be best seen in FIG. 7 and FIG. 8, an axial length 33 of the cable contact portion 21 is larger than an axial length 35 of the housing contact portion 25.

In FIG. 2, it is indicated that an inscribed circle 37 (also: incircle 37) in the cable receptacle 5, which touches the bottom 11 of the cable receptacle 5 extends radially, i.e. in the radial direction 15 outwards beyond the cable strand insertion opening 9. This is the case for all cable receptacles 5, independent on their size. It is noted that the bottom 11 of the cable receptacles 5 shown is formed as a half circle, where in different embodiments a different shape of the bottom 11 is conceivable. The bottom 11 may in particular be arcuate or may be semicircular in a cross-section being perpendicular to the axial direction 19. In such a case (not shown) the incircle 37 touches the cable receptacle 5 at at least three points. In any case, the incircle extends in the radial direction 15 beyond the cable strand insertion opening 7, also in the embodiments having a housing contact portion 25 (see FIG. 4).

As shown in FIG. 5 to FIG. 7, the cable contact portion 21 has a first circumferential groove 39. The first circumferential groove 39 is not present in the third embodiment shown in FIG. 8.

FIG. 5 to FIG. 8 show that a clamping mechanism 43, in the form of a bandstrap 45 is provided at the cable contact portion 21 (FIG. 8), respectively in the first circumferential groove 39 of the cable contact portion 21 (FIG. 5 to FIG. 7). The clamping mechanism 43 extends across the cable strand insertion openings 7 in the circumferential direction 23.

A second circumferential groove 41, shown in FIGS. 5-8, is provided in the housing contact portion 25. The second circumferential groove 41 is configured to receive a radially elastic member 47 which may be embodied as a continuous coil spring 49. The coil spring 49 may be connected at its two ends, e.g. by welding, or may be a circular self-locking ring, i.e. a metallic ring comprising elastic contact latches (leaf springs) deflectable in and against the radial direction. The latter embodiment of the radially elastic member may for instance be a circular V-spring. The first 39 and the second circumferential groove 41 both extend and open out into the radial direction 15.

In the following, FIG. 9 to FIG. 13 show different assembly steps for an inventive connector 51 that includes the cable retainer insert 1. The inventive connector 51 may in particular be a connector backshell 53 for terminating a wire and, in an embodiment, an agricultural industry connector 55 (see FIG. 13 and FIG. 15). In an embodiment, the connector 55 is in compliance with Agricultural Industry Electronic Foundation (AEF) standards. It may be applied to provide connectivity between a tractor and e.g. a tractor-trailer or tractor implements.

Figure 9:
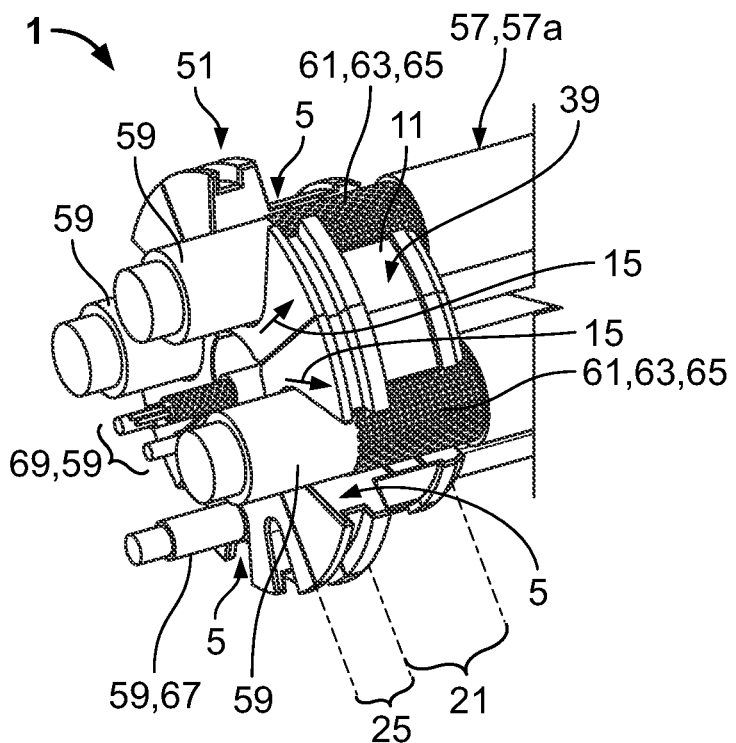
FIG. 9 is a first step of an assembly of a connector according to an embodiment.

In FIG. 9, a multi-strand cable 57 is provided, which comprises a multitude of cable strands 59, wherein some cable strands 59 may comprise a shielding 61 in the form of a mesh 63 or braid wire 65. The multi-strand cable 57 may in particular be a round hybrid cable 57a. The multi-strand cable 57 may contain different strands of different functionality. Exemplarily, it may comprise power strands for transmitting electric current or power, data strands 69 for transmitting data signals and a protective earth strand 67. Each strand may have its own shielding 61. An arbitrary number of each of those strands may be present. Moreover, multi-strand cables 57 may comprise an outer shielding 71 that surrounds all strands of the multi-strand cable 57. This continuous 360° shielding is to be transferred and maintained by the connector 51.

In the embodiment shown in FIG. 9, in some of the cable receptacles 5 of the cable retainer insert 1, a cable strand 59 is received. Due to the geometry of the cable receptacles 5 (see the description referring to the incircle 37 above) the cable strand 59, in particular the protective earth strand 67 and the shielding 61 extend radially outer walls beyond the cable strand insertion opening 7. In FIG. 9 to FIG. 13 the insertion opening 7 is not shown, but FIG. 4 is referred to, in which the inscribed circles 37 may represent the three cable strands 59 having a shielding 61 and the protective earth strand 67. Consequently, each shielding 61 and the protective earth strand 69 extend in the radial direction 15 beyond the bottom 11 of the first circumferential groove 39.

Figure 10:
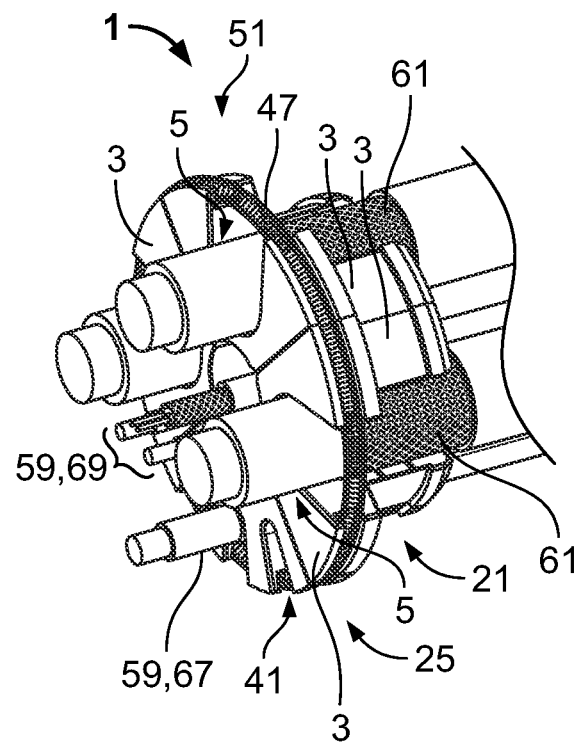
FIG. 10 is a second step of the assembly of the connector.

In FIG. 10, the radially elastic member 47 is provided in the second circumferential groove 41 of the housing contact portion 25, thereby fixing the position of the four cable retainer insert modules 3. In an embodiment, the radially elastic member 47 is formed of a conductive material.

Figure 11:
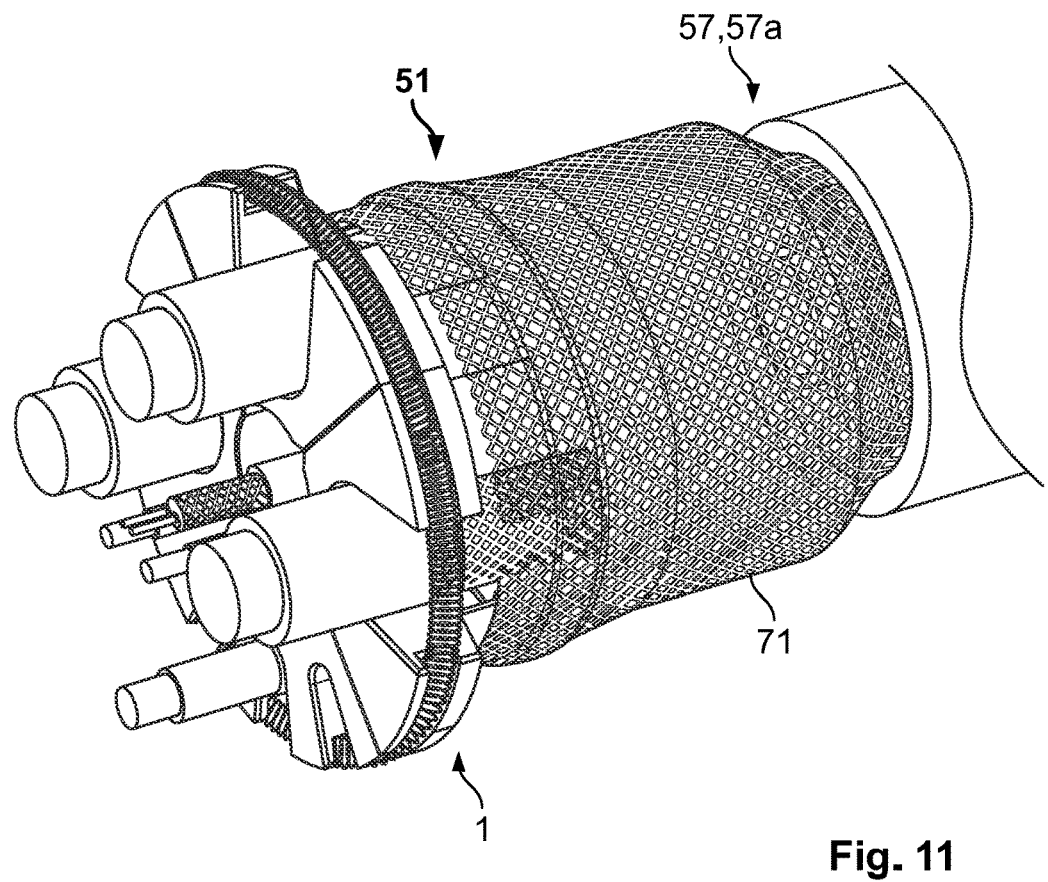
FIG. 11 is a third step of the assembly of the connector.

In FIG. 11, it is shown that the multi-strand cable 57 also comprises an outer shielding 71 which is not shown in FIG.

9 and FIG. 10 for the sake of clarity. The cable contact portion 21 is inserted into the outer shielding 71.

Figure 12:
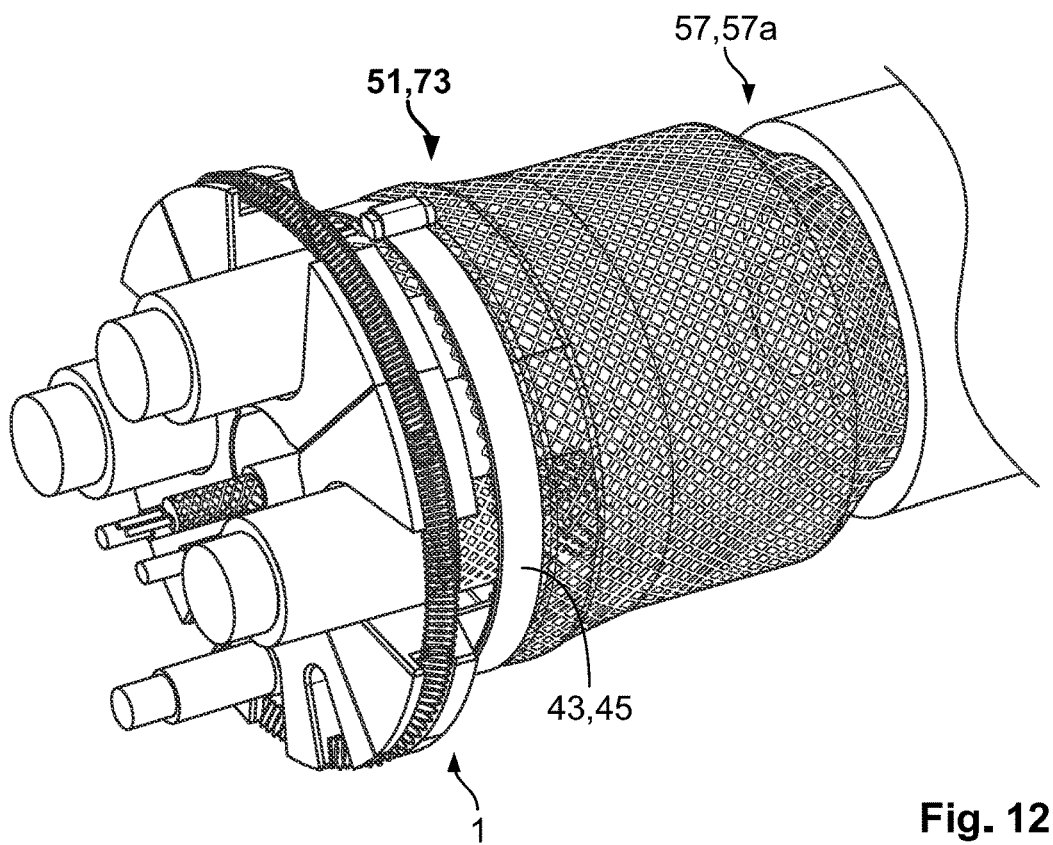
FIG. 12 is a fourth step of the assembly of the connector.

In FIG. 12, the clamping mechanism 43 in the form of the bandstrap 45 is inserted in the first circumferential groove 39. The cable retainer insert 1 in the housing 75 may securely fix the position of the outer shielding 71 with respect to the cable retainer insert 1 by the clamping mechanism 43. A shielding 61 of a strand or a strand received in the cable receptacle 5 also extends beyond the cable strand insertion opening 7 at a position where the bottom 11 of the groove 39 crosses the cable receptacle 5. The outer shielding 71 is displaced into the circumferential groove 39 as well as towards the cable strand insertion opening 7 by the clamping mechanism 43, thereby reliably electrically contacting the shielding 61 of the strands and strands with the outer shielding 71 and the cable retainer insert 1. At the same time, the clamping mechanism 43 presses the outer shielding 71 into the circumferential groove 39 against the bottom of the circumferential groove 39 in between adjacent cable strand insertion openings 7.

Figure 14:
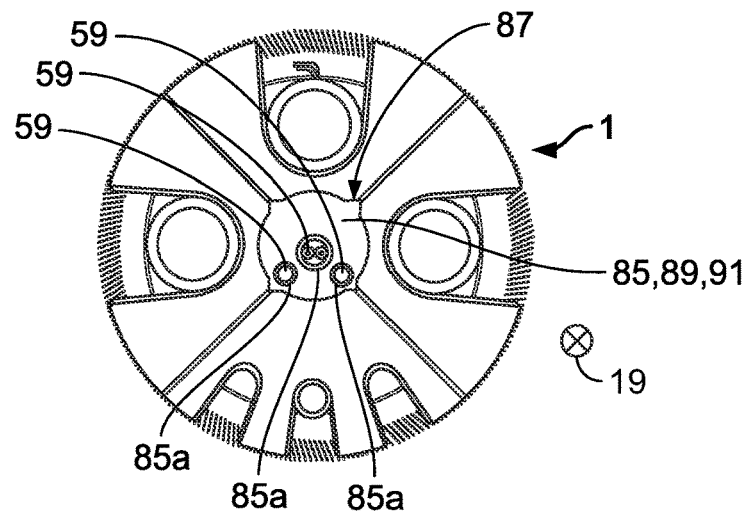
FIG. 14 is a front view of a cable retainer insert according to another embodiment in a preassembled state.

Thereby the outer shielding 71 is pressed against the bottom 11 of the first circumferential groove 39 as well as against the shieldings 61 and against the protective earth strand 67 (this is for instance visible in FIG. 14). As the cable retainer insert 1 is electrically conductive, it is electrically contacted by the shieldings 61 of the cable strands 59 and by the outer shielding 71. In this preassembly state 73, the outer shielding 71 is arranged between the cable strand insertion openings 7 (covered by the outer shielding 71 and the bandstrap 45) and the clamping mechanism 43.

Figure 13:
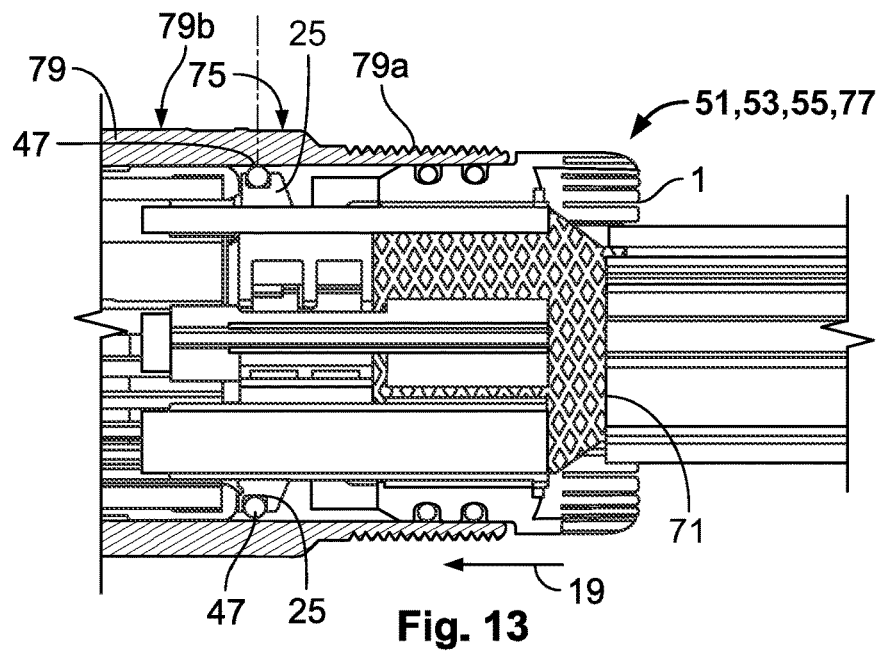
FIG. 13 is a sectional side view of the connector in an assembled state.
Figure 15:
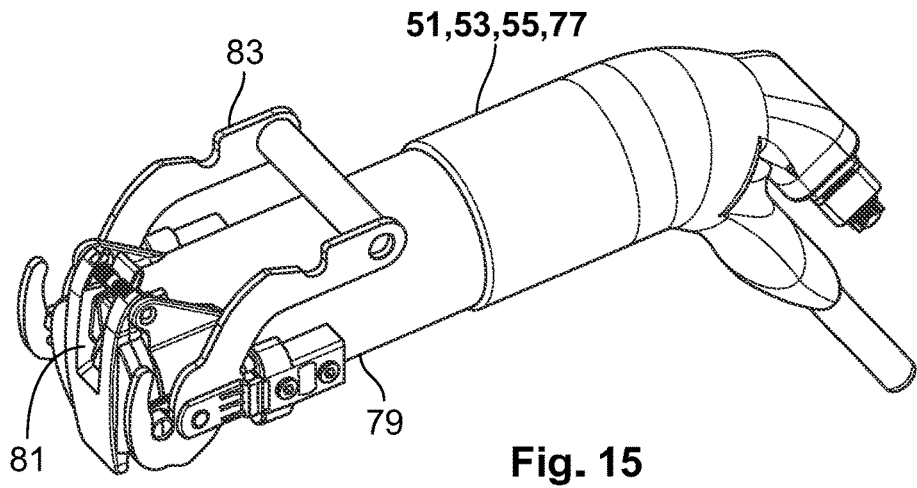
FIG. 15 is a perspective view of a connector according to an embodiment.
Figure 16:
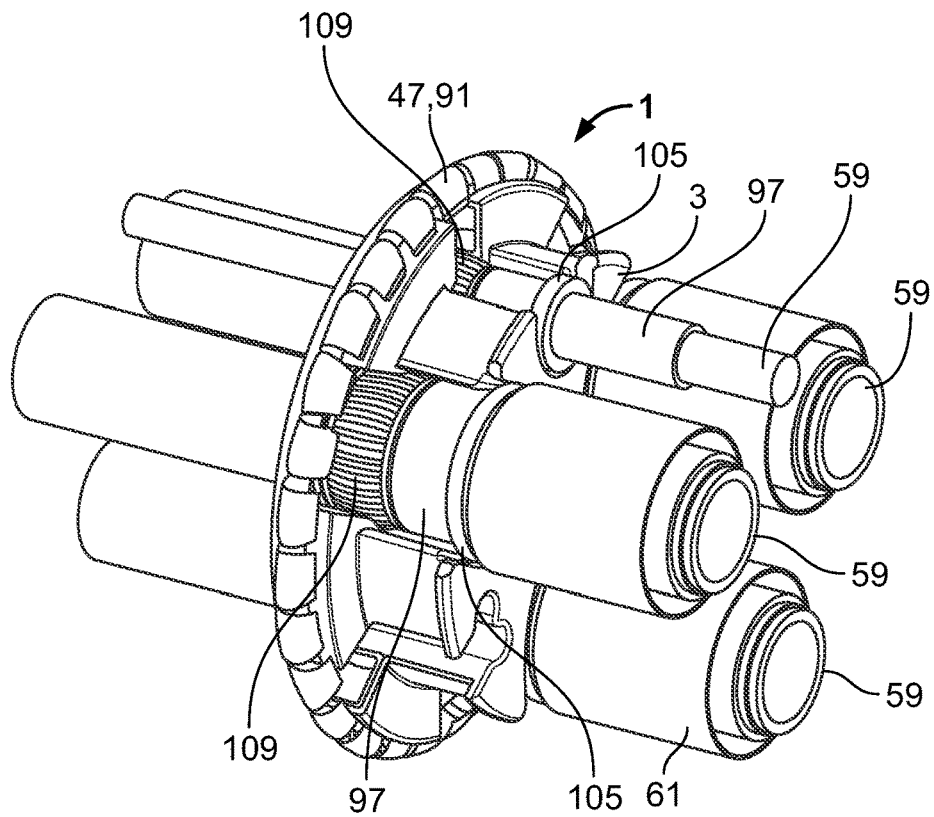
FIG. 16 is a perspective view of a cable retainer insert according to another embodiment.

As shown in FIG. 13 and FIG. 15, the cable retainer insert 1 is received in a connector housing 75, thereby forming the connector 51 in an assembled state 77.

It can be seen in FIG. 13 that the outer shielding 71 and (not visible) the protective earth strand 69 and the other shieldings 61 are connected to a metallic housing portion 79 of the housing 75 via the housing contact portion 25 and the radially elastic member 47. A backward portion 79a of the metallic housing portion 79 overlaps with the outer shielding 71, thereby providing an uninterrupted shielding of all strands 59 of the multi-strand cable 57. The metallic housing portion 79 has a forward portion 79b further providing shielding in the axial direction 19. As the diameter 29 of the housing contact portion 25 is larger than the diameter 27 of the cable contact portion 21, contacting of the housing 75 via the housing contact portion 25 does not influence or (negatively) effect receiving and contacting the strands 59 of the multi-strand cables 57 in or via the cable receptacle 5.

FIG. 15 shows the entire connector 51, which also comprises a front cover member 81, which is attached to the metallic housing portion 79 by a holding mechanism 83.

In FIG. 14, a further embodiment of the inventive cable retainer insert 1 is shown. This embodiment provides a center insert module 85 that is located in a center through hole 87. The center through hole 87 extends in the axial direction 19. The center insert module 85 may include a polymer 89 and may be nonconductive or elastic to reduce vibrations of the data strands 59 that are received in through holes 85a in the center insert module 85. The center insert module 85 may also comprise an elastomer 91. The material of the center insert module 85 may have a lower hardness than the material of the cable insert modules 3. The center insert module 85 may be vibration-reducing or vibration-isolating.

FIGS. 16 to 19 show a further embodiment of the inventive cable retainer insert 1, which differs from the previously shown embodiments of the cable retainer insert 1 in that only one cable retainer insert module 3 is provided. This cable retainer insert 1 is thus not modular.

Figure 17:
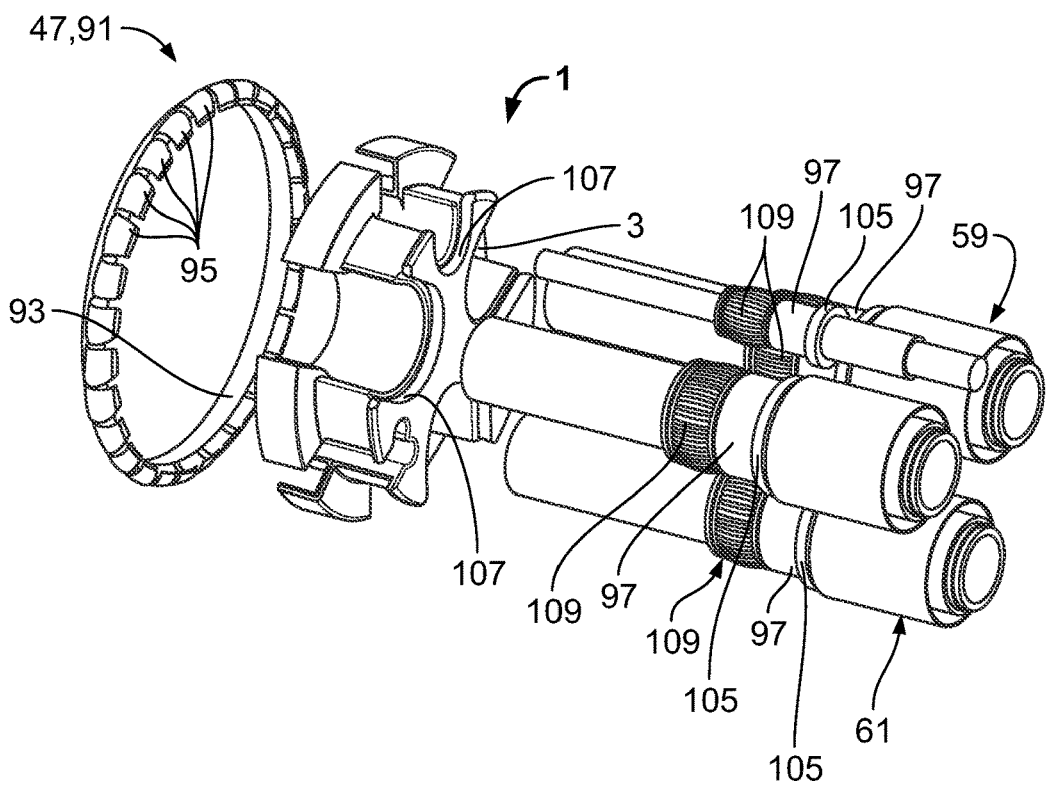
FIG. 17 is an exploded perspective view of the cable retainer insert of FIG. 16.
Figure 18:
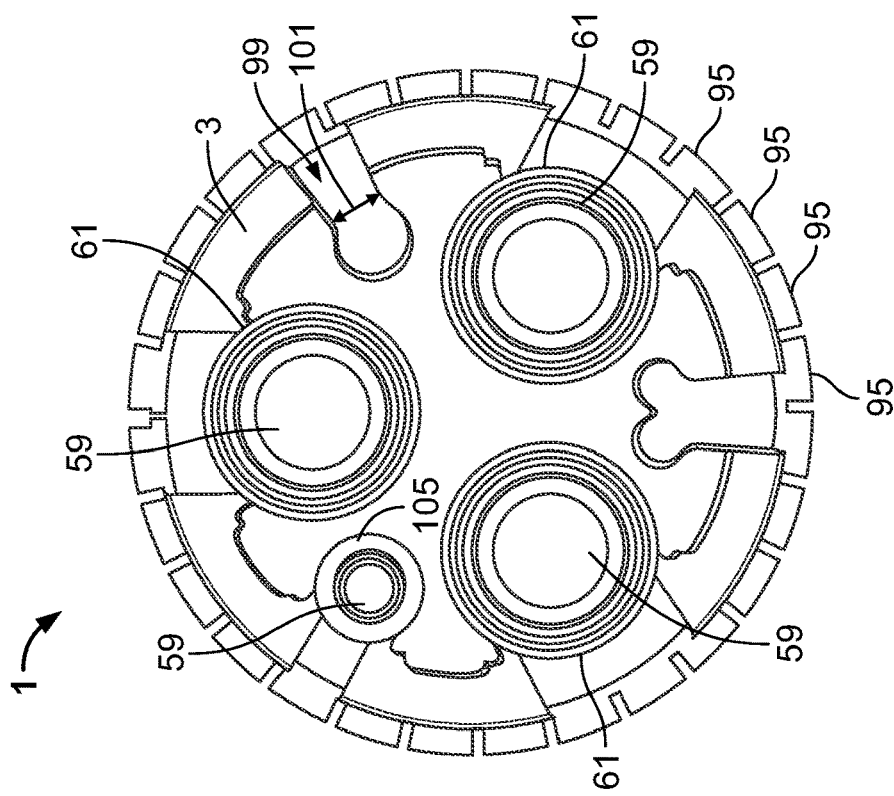
FIG. 18 is a front view of the cable retainer insert of FIG. 16.
Figure 20:
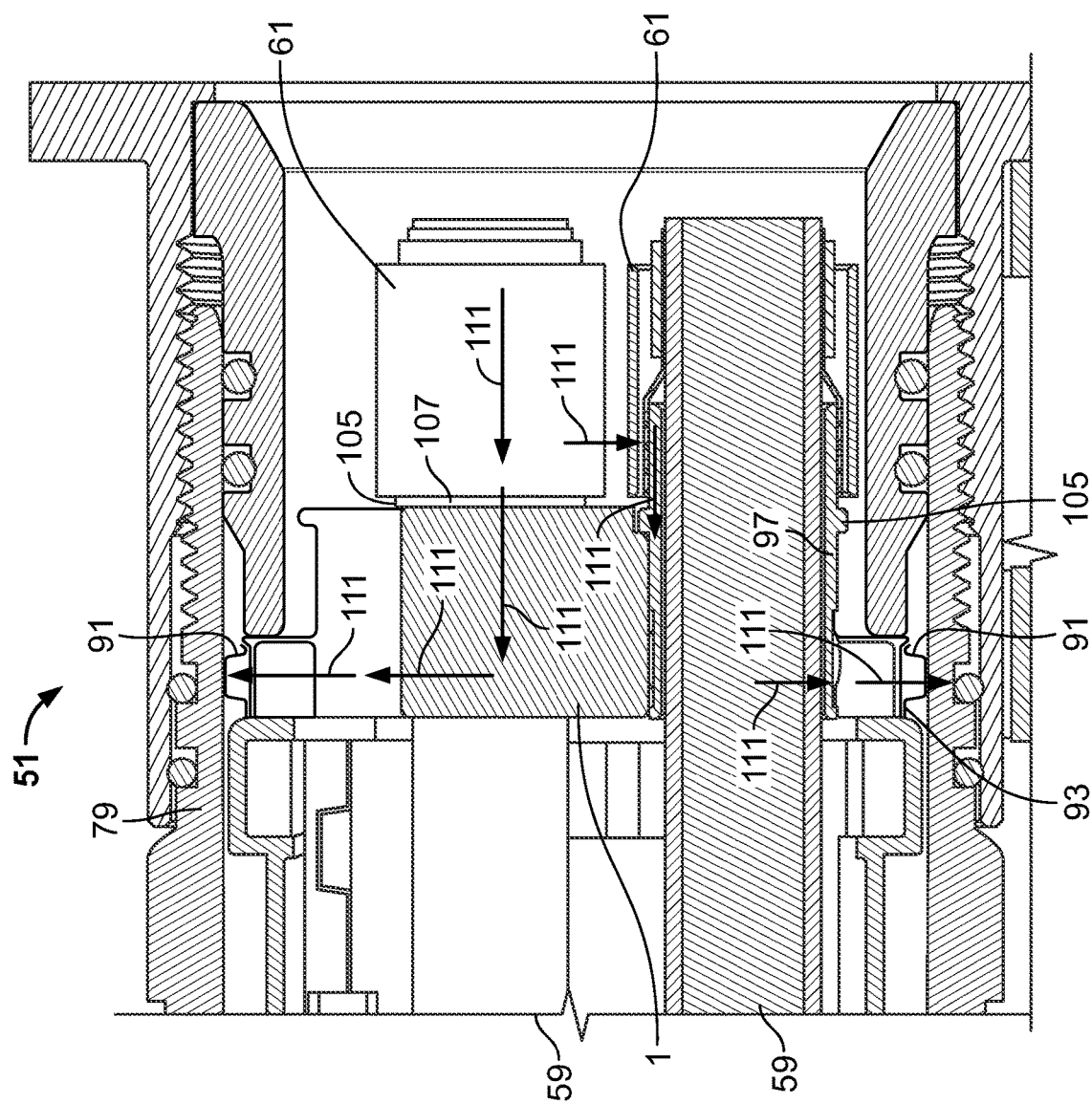
FIG. 20 is a sectional side view of a connector according to another embodiment.

This embodiment of the inventive cable retainer insert 1 shown in FIGS. 16 to 20 further comprises another embodiment of the radially elastic member 47, which is a circular leaf spring member 91 that comprises a circumferential base spring 93 (see FIGS. 17 and 20) and a multitude of leaf springs 95. The circular leaf spring member 91 may also be denoted as a circular self-locking ring. In FIGS. 17 and 18, only some of the circumferentially arranged leaf springs 95 are provided with a reference numeral. Such a circular leaf spring member 91 provides electrical and mechanical connection between the cable retainer insert 1 and the metallic housing portion 79 of the connector 51 (see FIG. 20).

In an embodiment, the cable contact portion 21 and the housing contact portion 25 are monolithically connected to each other. Thus, the electrical potential provided by the outer shielding 71 and/or the shieldings 61 of the strands 59 and/or a protective earth strand 67, are levelled and provided at the cable contact portion 21 as well as at the housing contact portion 25. Thus, the electrically conductive radially elastic member 47 may be configured to establish an electric contact between the cable retainer insert 1 and the housing 75 of the connector 51.

The cable strands 59 shown in FIGS. 16 to 20 are provided with a ferrule 97 which is electrically connected to the shielding 61 of the corresponding cable strand 59 via electromagnetic pulse technology, which represents a method connecting different materials with each other by an electromagnetic pulse that accelerates the different parts to be joined together via a strong electromagnetic field. Said parts are accelerated in opposite directions towards each other, wherein both parts are substance-to-substance bonded with each other. However, any suitable means for electrically connecting the shielding 61 of a strand 59 with the ferrule 97, as well as connecting the ferrule 97 electrically with the cable retainer insert 1, may be applied.

The embodiment of the inventive cable retainer insert 1 shown in FIGS. 16 to 20 further comprises differently shaped cable receptacles 5, best seen in FIG. 18. Such a maintaining receptacle 99 has a minimum insertion diameter 101 that is smaller than a ferrule insertion diameter 103. It is to be noted that the ferrule 97 may comprise a guiding collar 105 for positioning the ferrule 97 with respect to the cable retainer insert 1 by interaction with the guiding collar 105 with a stop shoulder 107. The ferrule 97 further comprises a lamella sleeve 109 that provides a multitude of individually deflectable lamellas (not provided with reference numerals) for providing an electrical contact between the ferrule 97 and the cable retainer insert 1. The ferrule 97 may thus comprise a multitude of circumferentially arranged contact points.

Figure 19:
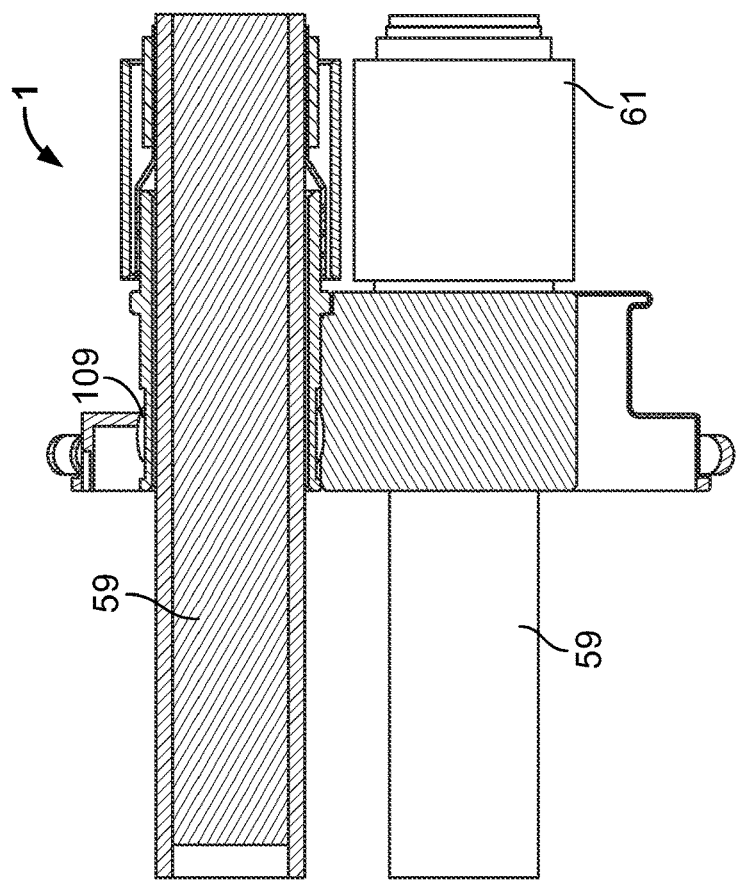
FIG. 19 is a sectional side view of the cable retainer insert of FIG. 16.

In FIG. 19, the contacting of the lamella sleeve 109 with the cable retainer insert 1 is shown in a cut view. Further, FIG. 20 denotes the transfer of an electric potential of the shieldings 61 by a transfer path 111 indicated by arrows. Said path 111 is from the shieldings 61 via the ferrule 97 to the cable retainer insert 1 and further via the circular leaf spring member 91 to the metallic housing portion 79 of the connector 51. It is to be noted that in FIG. 20, the circular leaf spring member 91 is compressed when being in contact with the metallic housing portion 79.

The cable retainer insert 1 and the connector 51 according to the invention have the advantage that both an unshielded strand (e.g. a protective earth strand) and a shielded strand of a multi-strand cable 57 may be securely received and held within the corresponding cable receptacle 5. The strand or the shielding of the strand may further be electrically contacted in a reliable way. The cable 57 protrudes from the cable receptacle 5, which facilitates friction and clamping of the cable 57 in the cable retainer insert 1.

The connector 51 allows for terminating a multi-strand cable 57 without deterioration of a shielding provided by the cable 57. The connector 51 thus allows for a continuous 360° shielding, which is not interrupted by the connector 51 itself. An overall cable shielding of the multi-strand cable 57 or a shielding of each strand of the multi-strand cable 57 is reliably transferred to the connector 51, such that each shielded cable is continuously provided with a 360° shielding. The inventive cable retainer insert 1 and the connector 51 may be applied in different technological fields in which a reliable transfer of a shielding is required. By the cable retainer insert 1 comprising at least two cable retainer insert modules 3, the connector 51 may be adapted to or applied for a wide variety of multi-strand cables 57 and is thus very versatile.

What is claimed is:

1. A cable retainer insert for a multi-strand cable, comprising;
   a cable contact portion;
   a plurality of cable receptacles in the cable contact portion circumferentially spaced from each other, each of the cable receptacles receives a strand of the multi-strand cable, each of the cable receptacles has a cable strand insertion opening at a radially outward end and a bottom at an opposite radially inward end, a circle inscribed in each of the cable receptacles and touching the bottom of the cable receptacle extends radially outward beyond the cable strand insertion opening; and
   a housing contact portion electrically contacting a housing of a connector in which the cable retainer insert is inserted, a diameter of the cable contact portion is smaller than a diameter of the housing contact portion.

2. The cable retainer insert of claim 1, wherein the cable retainer insert is electrically conductive.

3. The cable retainer insert of claim 1, wherein the cable retainer insert has a pair of cable retainer insert modules positioned adjacent to one another in a circumferential direction.

4. The cable retainer insert of claim 3, wherein each cable retainer insert module has at least one of the cable receptacles.

5. The cable retainer insert of claim 1, wherein the cable contact portion and/or the housing contact portion are a cylindrical section.

6. The cable retainer insert of claim 1, wherein an axial length of the cable contact portion is greater than an axial length of the housing contact portion.

7. The cable retainer insert of claim 1, further comprising a first circumferential groove.

8. The cable retainer insert of claim 7, further comprising a clamping mechanism inserted into the first circumferential groove and extending across the cable strand insertion opening in a circumferential direction.

9. The cable retainer insert of claim 7, further comprising a second circumferential groove.

10. The cable retainer insert of claim 9, further comprising a radially elastic member received in the second circumferential groove.

11. The cable retainer insert of claim 10, wherein the radially elastic member is a continuous coil spring or a circular self-locking ring.

12. The cable retainer insert of claim 9, wherein the first circumferential groove and/or the second circumferential groove are open in a radially outward direction.

13. The cable retainer insert of claim 1, further comprising a center through hole extending in an axial direction.

14. The cable retainer insert of claim 13, further comprising a center insert module disposed in the center through hole.

15. The cable retainer insert of claim 1, wherein the housing contact portion is adjacent to the cable contact portion along an axial direction of the cable retainer insert.

16. A connector, comprising:
    a cable having an outer shielding and a plurality of cable strands with a plurality of strand shieldings;
    a cable retainer insert including a cable contact portion and a plurality of cable receptacles in the cable contact portion circumferentially spaced from each other, each of the cable receptacles receives one of the plurality of cable strands, each of the cable receptacles has a cable strand insertion opening at a radially outward end and a bottom at an opposite radially inward end, a circle inscribed in each of the cable receptacles and touching the bottom of the cable receptacle extends radially outward beyond the cable strand insertion opening, the cable contact portion is inserted into the outer shielding; and
    a connector housing receiving the cable retainer insert.

17. The connector of claim 16, wherein the cable retainer insert is electrically contacted by the strand shieldings of the cable strands in the cable receptacles.

18. The connector of claim 17, wherein the outer shielding is arranged between the cable strand insertion openings and a clamping mechanism extending circumferentially across the cable retainer insert.

19. A cable retainer insert for a multi-strand cable, comprising;
    a cable contact portion;
    a plurality of cable receptacles in the cable contact portion circumferentially spaced from each other, each of the cable receptacles receives a strand of the multi-strand cable, each of the cable receptacles has a cable strand insertion opening at a radially outward end and a bottom at an opposite radially inward end, a circle inscribed in each of the cable receptacles and touching the bottom of the cable receptacle extends radially outward beyond the cable strand insertion opening; and
    a circumferential groove extending circumferentially around the cable retainer insert.

* * * * *